Feb. 22, 1955
J. L. DOUGHERTY ET AL
2,702,475
GAUGE FOR DRY SAND TANKS
Filed Aug. 29, 1951
2 Sheets-Sheet 1
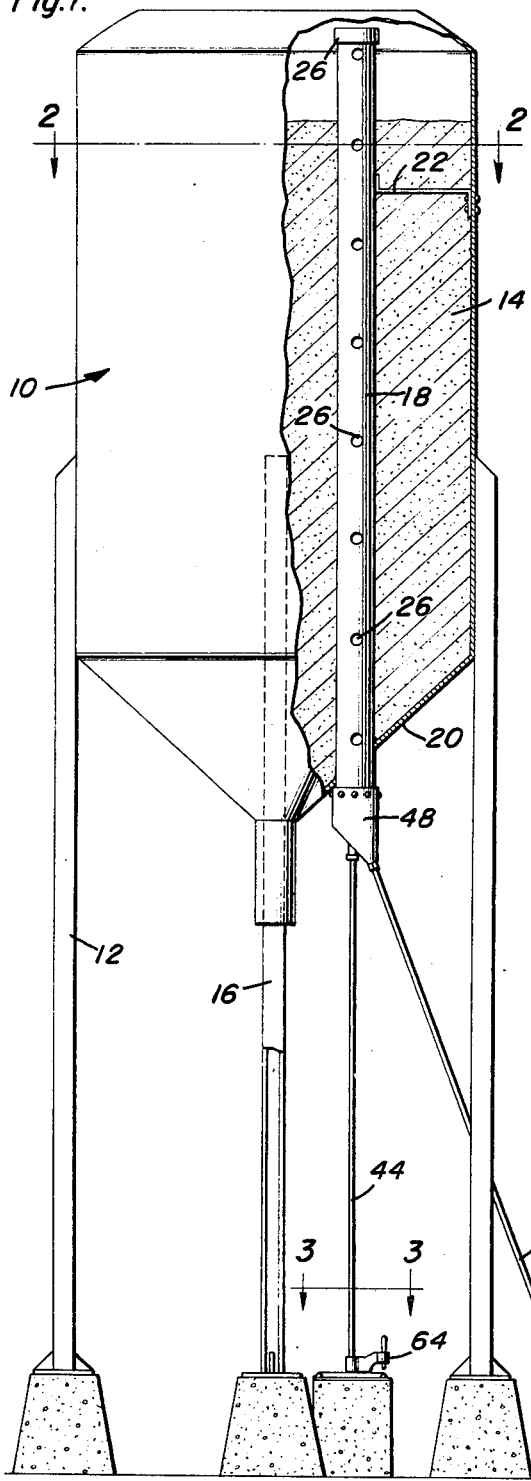
Fig./.
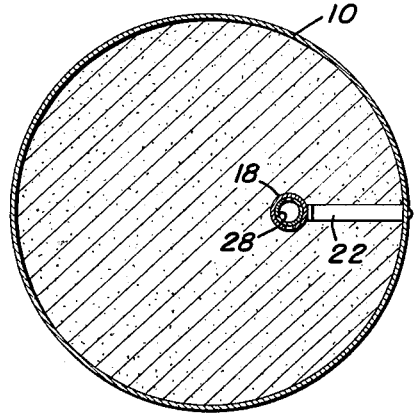
Fig. 2.
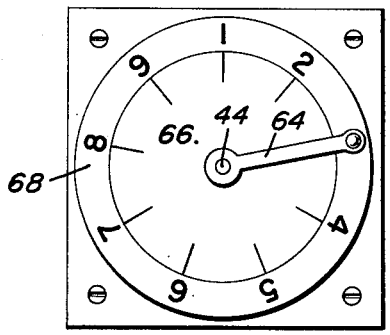
Fig. 3
James L. Dougherty
William O. Bane
INVENTORS
BY *Clarence A. O'Brien*
*and Harvey B. Jacobson*
Attorneys Feb. 22, 1955     J. L. DOUGHERTY ET AL     2,702,475
GAUGE FOR DRY SAND TANKS
Filed Aug. 29, 1951     2 Sheets-Sheet 2
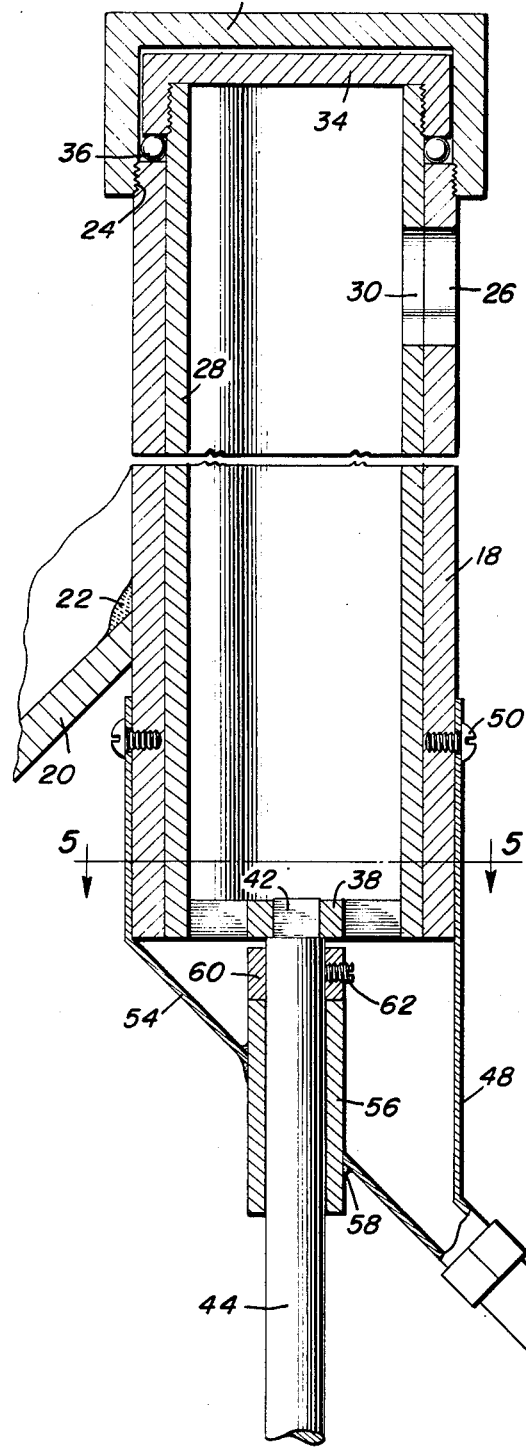
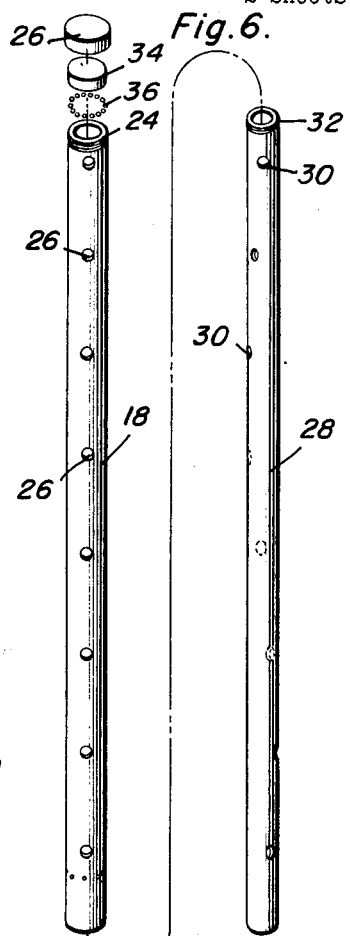
James L. Dougherty
William O. Bane
INVENTORS

United States Patent Office 2,702,475
Patented Feb. 22, 1955

2,702,475

GAUGE FOR DRY SAND TANKS

James L. Dougherty, Ridgeley, W. Va., and
William O. Bane, Cumberland, Md.

Application August 29, 1951, Serial No. 244,238

2 Claims. (Cl. 73—290)

This invention comprises novel and useful improvements in a gauge for dry sand tanks and more specifically pertains to a novel sand level testing gauge for use in dry sand tanks for railways and the like and which shall provide a means for accurately ascertaining the sand level within the sand tank at a remote point therefrom.

The primary object of this invention is to provide a sand level testing gauge associated with and particularly adapted for use in dry sand tanks of the type mounted upon platforms or elevated supports for use with railways and whereby a person may readily and accurately ascertain the level of the sand therein from a remote position as from the ground below or adjacent thereto.

A further object of the invention is to provide a sand testing gauge whereby a person may visually and conveniently ascertain the level of sand within the elevated sand tank.

Yet another object of the invention is to provide a testing gauge of the character in which the gauge may be readily adjusted for gauging different levels of sand; and shall be constructed in a manner to withstand long usage despite the abrasive effects of sand passing therethrough.

These, together with various ancillary features and objects of the invention, which will later become apparent as the following description proceeds, are attained by the present invention, a preferred embodiment which has been illustrated, by way of example only, in the accompanying drawings, wherein:

Figure 1 is an elevational view of a suitable sand tank incorporating therein the testing device in accordance with the principle of this invention, part of the tank being broken away and shown in section;

Figure 2 is a horizontal sectional view taken substantially upon the plane indicated by the section line 2—2 of Figure 1;

Figure 3 is a horizontal sectional view taken substantially upon the plane indicated by the section line 3—3 of Figure 2;

Figure 4 is a fragmentary vertical transverse sectional view, parts being broken away and upon an enlarged scale of the sand testing gauge in accordance with this invention and showing the connection therewith of the adjusting means and of the sand discharge means;

Figure 5 is a horizontal section view taken substantially upon the plane indicated by the section line 5—5 of Figure 4; and Figure 6 is an exploded perspective view of the various elements making up the sand testing gauge.

Referring now more specifically to the accompanying drawings, wherein like numerals designate similar parts throughout the various views, it will be seen that numeral 10 designates generally a sand tank of any desired construction, which is mounted in elevated position upon supports or standards 12 in order to elevate the sand 14 contained within the tank at a sufficient elevation to enable the same to feed by gravity into railway engines or the like for use in their sanding devices.

The sand tank is provided with the usual filling pipes 16 by means of which dry sand is blown into the tank whenever the same needs to be replenished. In tanks of this character, when sand is withdrawn by locomotive, the attendant finds it difficult and inconvenient to accurately ascertain the need for refilling of the tank; and the quantity of sand required to replenish the tank. The present invention provides an improved means for effectively and advantageously testing the level of the sand within the tank from time to time with both ease and certainty.

The novel sand gauge in accordance with this invention comprises an outer casing 18 of any requisit length and size and material, and preferably disposed in the form of a tube or pipe having its extremities open, this pipe extending through the sloping bottom wall 20 of the sand tank and being secured thereto as by welding or the like at 22; and being braced against the side wall of the tank upon the interior thereof as by one or more laterally extending braces 22 which may be welded to the outer casing 18 and secured to the tank by rivets or in any other desired manner.

The upper and lower ends of the outer casing 18 are opened, the upper end being externally threaded as at 24, see Figures 4 and 6, for the reception of a closure cap or cover 26. A number of gauge openings 26 are provided in the outer casing 18, these openings being disposed at different levels and corresponding to different convenient sand levels within the tank.

Rotatably received within the outer casing is an inner casing 28 which likewise is provided with a plurality of sand level testing openings 30, these openings however being provided in axial and circumferentially spaced relationship along the inner casing. Each opening 30 is disposed in the same horizontal plane as one of the openings 26 of the outer casing, so that upon relative rotation of the inner casing the openings 30 will successively and sequentially align with the openings 26 of the outer casing. Thus, openings at selected levels may be caused to successively register whereby if the sand level extends above that opening and the openings avoid the registry, sand will flow into the interior of the inner casing for a purpose which will be later apparent.

The inner casing is likewise externally screw threaded at its upper end as at 32 and in turn is provided with a closure cap 34. The external diameter of the closure cap 34 is equal to or less than the external diameter of the outer casing 18 whereby the closure cap 26 of the latter may close and envelop the upper ends of both casings and the closure cap of the inner casing as shown in Figure 4.

The inner casing is rotatably supported in a depending manner from the upper end of the outer casing by an assembly of ball bearings or open end top friction means 36 which are positioned between the adjacent horizontal surfaces of the upper end of the outer casing and the lower end of the inner cap.

Conveniently, the bottom end of the inner casing is provided with a spider 38 or other apertured plate whereby the interior of the inner casing and the sand passing therein as above mentioned may be discharged downwardly therefrom. The central portion of this spider is provided with a non-circular aperture 40 adapted to receive the correspondingly shaped upper end 42 of a vertically disposed adjusting rod 44. Thus, by rotation of the rod 44, rotation may be imparted to the inner casing to thereby cause selective registry of the level gauging apertures of the two casings.

A sand discharging means is provided for collecting the sand into the inner casing and from the apertured lower end of the same and discharging the sand into a collecting bin 46 and positioned upon the ground or at some removed point from the tank in such a manner that a passage of the sand thereinto may be visually observed by the person testing the level of sand in the tank.

This sand discharging means comprises a bin or hopper 48 which at its open upper end embraces the lower portion of the outer casing 18, being retained thereon as by fastening screws 50 or the like, and which at its bottom end is connected with a drain pipe 52 whose open lower end discharges into the bin 46.

The hopper 40 is provided with a sloping side wall 54 and in this side wall is secured a guide bushing 56 as by welding or the like 58. The adjusting rod 44 is journaled in this bushing 56 and extends upwardly above the upper end of the same, and a collar 60 releasably secured by set screw 62 is provided upon the adjusting rod and rests upon the upper end of the bushing 56 to support the weight of the adjusting rod therefrom.

At its lower end, the adjusting rod is provided with a manual operating handle 64 which is disposed above and in close juxtaposition to the horizontally arranged plate 66 having gauging indicia 68 thereon. These indicia correspond to the individual sand testing or gauging openings of the testing member and thus enables the operator to ascertain which level is being tested for the presence of sand in the tank.

It should be particularly observed that the adjusting rod 44 is supported dependingly from the sand testing gauge and specifically from the hopper 48 thereof; while the inner testing gauge member is supported from the outer by the above mentioned anti-friction bearing assembly.

From the foregoing, the construction and operation of the device will be readily understood and further explanation is believed to be unnecessary. However, since numerous modifications and changes will readily occur to those skilled in the art it is not desired to limit the invention to the exact construction shown and described, and accordingly all suitable modifications and equivalents may be resorted to, falling within the scope of the appended claims.

Having described our invention, what is claimed as new is:

1. In combination, a dry sand storage and dispensing tank for railway locomotive sanders, sand level testing means in said tank and adjusting means therefor exteriorly of said tank, said testing means comprising an outer casing having sand inlet openings at different levels, an inner casing rotatable within the outer casing and having openings in axially and circumferentially spaced positions, each of the openings of the inner casing being successively registerable with those of the outer casing upon relative rotation of said casings, said adjusting means being connected to one of said casings, a sand discharge means communicating with the interior of the inner casing and delivering sand entering therein through said registering openings, said inner casing being supported upon the outer casing by a bearing assembly, a closure cap on the upper end of the inner casing engaging said bearing assembly.

2. In a sand storage tank, sand level gauging means comprising an outer casing having sand inlet openings at different levels, an inner casing rotatable within said outer casing and having openings in axially and circumferentially spaced positions, each of the openings of the inner casing being successively registerable with those of the outer casing upon relative rotation of said casings, adjusting means for bringing said openings into registry being connected to one of said casings, a sand discharge means communicating with the interior of the inner casing and delivering sand entering through said registering openings, a closure cap on the upper end of said outer casing, a closure cap on the upper end of said inner casing disposed within said first mentioned closure cap and having its peripheral edge spaced above the upper end of the outer casing to form a bearing race therebetween, and anti-friction bearing members in the bearing race.

References Cited in the file of this patent

UNITED STATES PATENTS

| | | |
|---|---|---|
| 2,331,208 | Ludi | Oct. 5, 1943 |
| 2,377,343 | Holicer | June 5, 1945 |
| 2,398,958 | Pellettere | Apr. 23, 1946 |
| 2,505,916 | Salvesen | May 2, 1950 |